United States Patent

[11] 3,629,513

[72] Inventor Alexander Feiner
Rumson, N.J.
[21] Appl. No. 879,203
[22] Filed Nov. 24, 1969
[45] Patented Dec. 21, 1971
[73] Assignee Bell Telephone Laboratories, Incorporated
Murray Hill, N.J.

[54] UNBALANCED AND BALANCED SWITCHING NETWORK FOR BALANCED TRANSMISSION CIRCUITS

21 Claims, 3 Drawing Figs.

[52] U.S. Cl. .......... 179/18 GF
[51] Int. Cl. .......... H04q 3/42
[50] Field of Search .......... 179/18 GF, 18 AF, 18 G, 18 GE, 170 D, 16 C, 16 EC, 18 F, 18 FA

[56] References Cited
UNITED STATES PATENTS

| | | | |
|---|---|---|---|
| 3,489,856 | 1/1970 | Brightman .......... | 179/18 GF |
| 3,278,689 | 10/1966 | Sanders et al. .......... | 179/18 GF |
| 3,300,587 | 1/1967 | Knight et al. .......... | 179/18 AF |

*Primary Examiner*—Kathleen H. Claffy
*Assistant Examiner*—William A. Helvestine
*Attorneys*—R. J. Guenther and R. B. Ardis

ABSTRACT: A single and double wire switching arrangement in which each balanced two-wire transmission circuit is transformer coupled with two single-wire network terminations with capacitive DC isolation between the transformer windings and a reference potential connected between the isolating capacitors. Either of two unbalanced single-wire paths or one balanced two-wire path can be established through the network from each transmission circuit. A single-wire path is sufficient for most functions; however, the two-wire path is available for those functions requiring a metallic or a balanced path. Network blocking is low since the majority of network paths are single wire thus freeing unused single-wire links, for other paths. Supervision can be maintained either at a transmission circuit or at a junctor circuit included in the network path.

INVENTOR
A. FEINER
BY [signature]
ATTORNEY

UNBALANCED AND BALANCED SWITCHING NETWORK FOR BALANCED TRANSMISSION CIRCUITS

FIELD OF THE INVENTION

This invention is relative to communications switching networks and to communication systems wherein communication paths are selectively established between transmitting and receiving arrangements.

DESCRIPTION OF THE PRIOR ART

Communication transmission path circuits normally are balanced from a transmission standpoint and comprise multiconductor communication paths. The majority of communication switching systems now in service include switching networks through which a balanced multiconductor network path is established between selected transmission path circuit terminations on the network. Examples of this type of switching system include the Bell System No. 5 Crossbar Switching System, the Bell System No. 1 Electronic Switching System, and many other well-known communication switching systems. It also is known in the communication switching art to provide balanced communication paths through a switching network which have fewer conductors (e.g., two conductors) than the transmission circuits (e.g., four conductors) between which the network path is established. In this type of arrangement, a hybrid circuit is employed to couple the transmission circuit with the network termination thereof.

Some switching systems include switching networks which selectively establish unbalanced network paths between balanced transmission circuits. This is particularly evident in the recent systems employing single-conductor networks with semiconductor cross-points In such systems, a balanced transmission circuit is inductively coupled with a single-wire, ground return, network terminal. The single-wire network path is unbalanced from a transmission standpoint but is suitable for the majority of communication purposes when properly designed. The single-wire unbalanced network communication path is prevalent in the end marked, self-seeking type of switching network.

As noted above and as evidenced by the increasing number of proposals for single-wire switching networks, an unbalanced single-wire communication path is suitable for the majority of communication functions. Accordingly, the provision of a multiconductor balanced network path often is unnecessary with respect to the type of communications being transmitted over the network path. In this situation, a portion of the balanced multiconductor network path is wasted from a functional standpoint since a single-wire unbalanced network path would be sufficient.

Single wire unbalanced transmission paths are not suitable for certain communication switching functions. It is well known that unbalanced transmission paths through a switching network create crosstalk problems. Where a very high grade of transmission is required, unbalanced transmission paths are unsatisfactory. Unbalanced transmission paths provided in prior single-conductor switching network arrangements cannot be used for many DC signaling and testing purposes. This is because no continuous DC loop is provided from the transmission circuit through the network. Accordingly, for example, a single-wire unbalanced AC-coupled path cannot generally be used as a signaling link between a transmission circuit and DC signal receiving equipment, e.g., a dial pulse receiver. Where unbalanced single-wire network paths are employed, special signaling techniques must be used and special signaling equipment must be provided. These special techniques and special equipment are not readily compatible with existing standard communication equipment. Therefore, their provision unduly complicates a switching system and they are expensive to install and maintain.

It is an object of this invention to utilize fully the traffic-handling capacity of a switching network in accordance with the type of transmission facility required by the respective communication functions for which the switching network is employed.

SUMMARY OF THE INVENTION

According to the invention, a balanced multiconductor transmission circuit is inductively coupled to a plurality of unbalanced single-conductor network terminations so that any one of a plurality of single-conductor transmission paths can be established through the network or, alternatively, a single balanced multiconductor transmission path can be established through the network. Capacitive isolation with a ground reference point is provided between the single-conductor network terminations. An unbalanced single-conductor network connection is sufficient for most communication functions (e.g., talking, ringing, some types of data transmission, etc.) however the multiconductor balanced transmission connection can be established for those functions requiring either a balanced transmission path or a complete metallic connection through the network (e.g., dial pulse detection, DC-signaling, network and station testing, certain types of data transmission, etc.) Blocking in the network is substantially reduced since the majority of connections through the network will be on a single-conductor basis. The corresponding unused single-conductor network links are thereby made available for other single-conductor network connections. Provision is made for maintaining DC supervision of either single-conductor or multiconductor transmission paths at the transmission circuit itself, at a junctor circuit included in a network connection, or at a service circuit connected by the network with a transmission circuit.

Full use can be made of the traffic-handling capabilities of the network by establishing either a single-conductor unbalanced network connection or a multiconductor balanced network connection according to the requirements of the system function to be served by the network connection.

DETAILED DESCRIPTION

Figure 1:
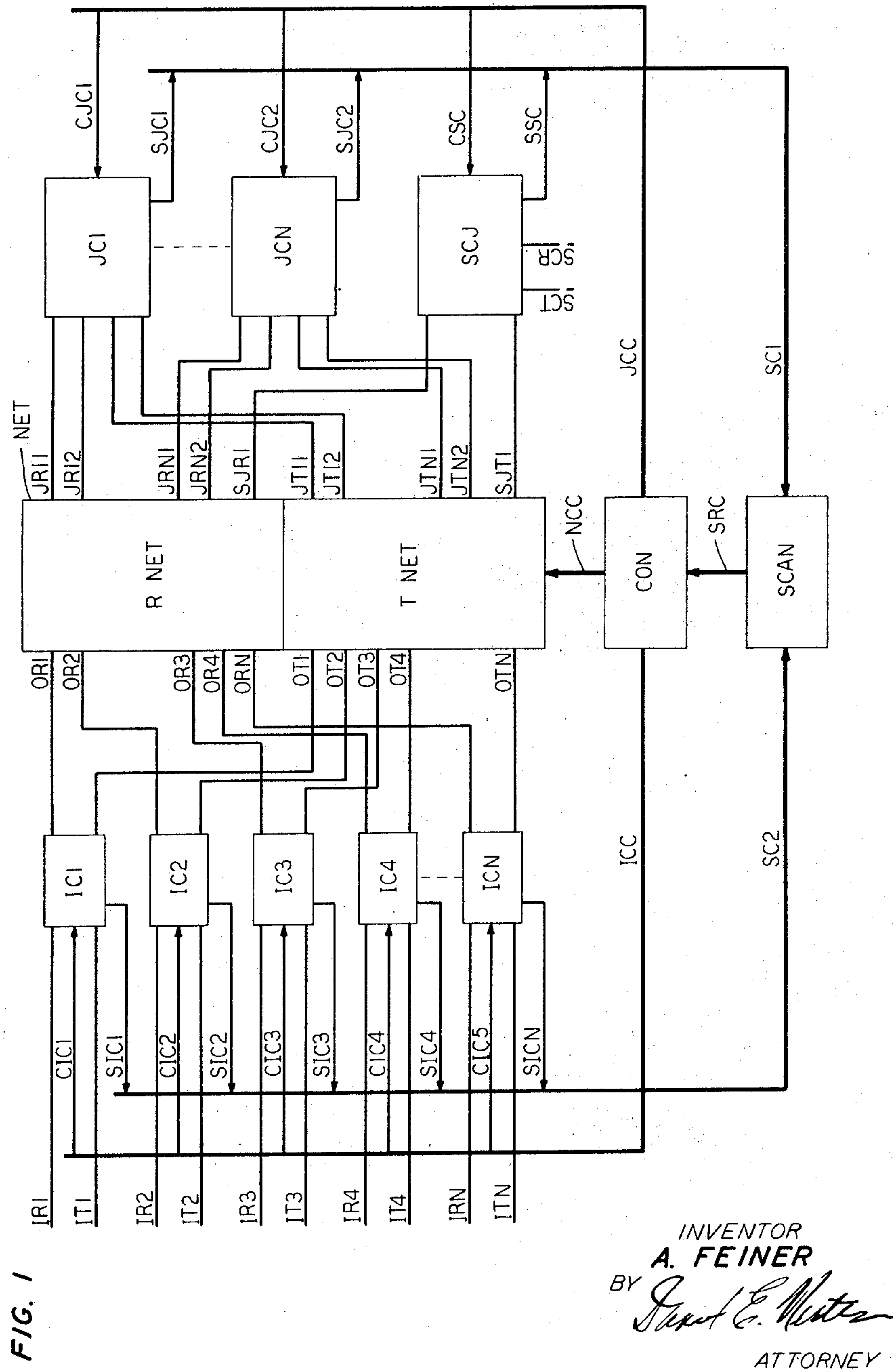
FIG. 1 is a block diagram of an illustrative communications switching system in which the present invention advantageously can be employed.

General System—FIG. 1

The illustrative communications switching system shown in FIG. 1 comprises an illustrative multistage switching network NET upon which are terminated a plurality of transmission path circuits IC1, IC2, IC3, IC4 through ICN; a plurality of junctor circuits JC1 through JCN; and a plurality of service circuits such as SCJ. Connections through network NET between transmission path circuits IC1–ICN are established through one of the junctor circuits JC1–JCN, thereby traversing the network NET twice. Connections from transmission path circuits IC1–ICN to a service circuit such as SCJ traverse network NET only once. Network NET is fully bidirectional. Therefore, the side of network NET upon which the various circuits IC1–ICN, JC1–JCN, and SCJ are terminated is not fixed. These circuits can be terminated on either side of network NET.

A scanner SCAN receives supervisory information from the various transmission, junctor, and service circuits IC1–ICN, JC1–JCN, and SCJ, terminated on network NET over channels SC1 and SC2. This supervisory information is transmitted from scanner SCAN over channel SRC to the control arrangement CON. Control arrangement CON interprets the information received from scanner SCAN and formulates control signals for transmission to various parts of the switching system. Signals for selectively controlling the establishment and release of connections through network NET are transmitted from control CON to network NET over channel NCC. Signals for controlling the internal operations of the transmission path circuits IC1–ICN are transmitted from control CON over channel ICC. Control signals for controlling the internal operations of junctor circuits JC1–JCN and service circuits such as SCJ are transmitted from control CON over channel JCC. Many arrangements capable of fulfilling the functional requirements of scanner SCAN and control CON are known in the communications switching art. Therefore, no detailed discussion of these system elements is included herein.

Network NET, as illustrated in FIG. 1, is divided into two parts RNET and TNET to emphasize the principles of the present invention. Such a network separation can be either physical or merely functional within the teaching of this invention. This will be illustrated by a discussion presented later herein.

Each of the transmission path circuits IC1–ICN is fed by a two-wire transmission circuit wherein the two transmission wires are respectively designated tip and ring in accordance with well-known telephone terminology. For example, transmission path circuit IC1 is fed by ring-conductor IR1 and tip-conductor IT1. Each of the transmission path circuits IC1–ICN includes a single-conductor termination on the RNET portion of network NET and a single-conductor termination on the TNET portion of network NET. For example, transmission path circuit IC1 has a ring-conductor termination OR1 on portion RNET of network NET and a tip-conductor termination OT1 on portion TNET of network NET.

Each of the junctor circuits JC1–JCN is terminated twice on each portion RNET and TNET of network NET. For example, junctor circuit JC1 has two ring-conductor terminations JR11 and JR12 on portion RNET of network NET and two tip-conductor terminations JT11 and JT12 on portion TNET of network NET.

With this network configuration, a single-wire unbalanced network path can be established through network NET between transmission path circuits through a junctor circuit by exclusive use of either the RNET portion of network NET or the TNET portion of network NET. For example, if network connections are established between network terminals OR1 and JR11 and between JR12 and OR2, a single-wire communications path is established from transmission path circuit IC1 to transmission path circuit IC2 through the RNET portion of network NET and junctor circuit JC1. A similar single-wire network path can be established between transmission path circuits IC1 and IC2 through the TNET portion of network NET. If both of these single-wire network paths are established in parallel, the result is a balanced two-wire network path between transmission path circuits IC1 and IC2 through junctor circuit JC1 utilizing both portions RNET and TNET of network NET. Thus, either one of two unbalanced single-wire paths or a single balanced two-wire path can be established between any two transmission path circuits IC1–ICN through network NET and a selected junctor circuit JC1–JCN.

Service circuits such as SCJ are employed to perform the many administrative and supervisory functions associated with the operation of a communications switching system. Such tasks include the reception of call-signaling information in various signaling formats, the transmission of call-signaling information in various signaling formats, the generation of various tones, the provision of access to the switching network NET for network trunk, line, and station-testing purposes, and various other service functions. Service circuit SCJ also is fed by a tip-conductor SCT and a ring-conductor SCR. The source of conductors SCT and SCR depends upon the particular function performed by service circuit SCJ. Service circuit SCJ has a single ring-conductor termination SJR1 on the RNET portion of network NET and a single tip-conductor termination SJT1 on the TNET portion of network NET. By selective employment of the network portions TNET and RNET, either of two single-wire network paths or a single two-wire network path can be established between service circuit SCJ and any transmission path circuit IC1–ICN.

As noted above, the division of network NET into two separate parts RNET and TNET can be either physical or functional. If the separation is physical, i.e., two physically separate networks are provided, since the majority of connections through network NET will be on a single-wire basis, each separate network portion RNET and TNET will handle approximately one-half of the traffic served by the overall network NET. Only those system functions requiring a two-wire network path will employ both portions TNET and RNET of the overall network NET. Thus, network NET has nearly twice the traffic-handling capability of a network exclusively devoted to the establishment of two-wire connections between terminals thereof.

If the separation of network NET into two portions RNET and TNET is merely functional, i.e., there is no actual physical separation into separate networks, the effect is substantially the same. By appropriate selective control of one-half the single-wire links of network NET, the corresponding unused single-wire links are available for other network connections.

Figure 2:
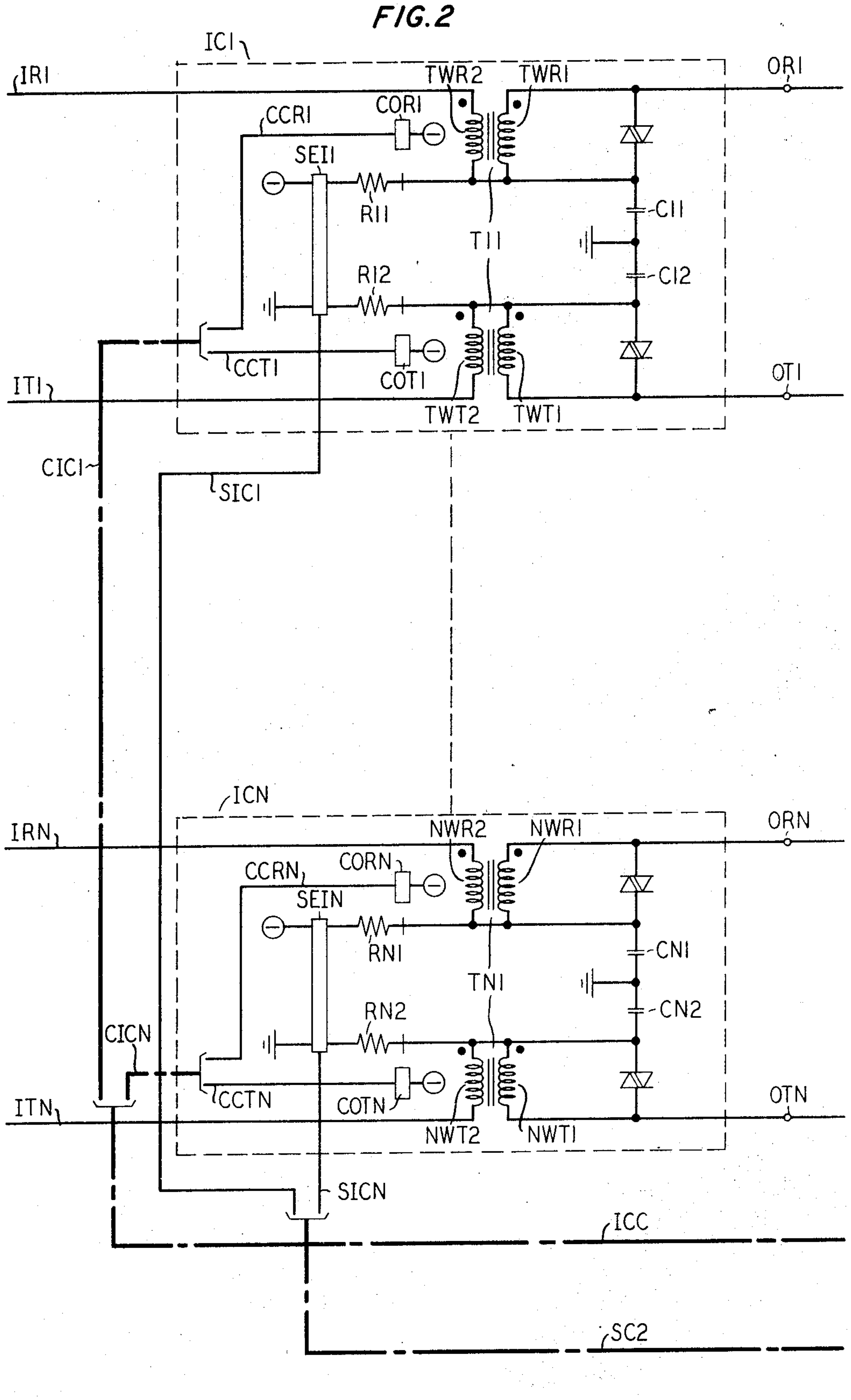
FIGS. 2 and 3, when placed side by side, illustrate schematically typical transmission path circuits terminated on a switching network and embodying the principles of this invention.

Transmission Path Circuits—FIG. 2

Referring now to FIG. 2 of the drawing, transmission path circuit IC1 will be described as typical of transmission path circuits IC1–ICN. Ring-conductor IR1 is transformer-coupled through two windings TWR1 and TWR2 of transformer T11 to ring-conductor terminal OR1 of network NET. Ring-conductor IR1 also is DC-connected through the same two windings TWR1 and TWR2 of transformer T11 to ring-terminal OR1 of network NET. Similarly, tip-conductor IT1 is transformer-coupled through the other two windings TWT1, TWT2 of transformer T11 to tip-conductor terminal OT1 of network NET. Also, tip-conductor IT1 is DC-connected through those same two windings TWT1 and TWT2 of transformer T11 to terminal OT1 of network NET. Thus, both tip- and ring-conductors IR1 and IT1 are transformer-coupled to each of the respective network terminals OR1 and OT1 and each is DC-connected with one of the network terminals OR1 and OT1.

Negative and ground potentials for producing loop current in tip- and ring-conductors IR1 and IT1 are supplied through a supervisory sensing element SEI1, resistors R11 and R12, the normally closed contacts of cutoff relays COR1 and COT1, and the respective windings TWR2 and TWT2 of transformer T11. Sensing element SEI1 is connected over conductor SIC1 through cable SC2 to scanner SCAN and serves to provide supervisory change-of-state information to scanner SCAN. Sensing element SEI1 can be any of the well-known supervisory sensing elements employed for this purpose in communications switching systems.

Capacitors C11 and C12 provide DC isolation between the network terminals OR1 and OT1. Ground potential connected between capacitors C11 and C12 serves as a reference potential for an unbalanced single-wire network path from either terminal OR1 or OT1. Cutoff relays COR1 and COT1 provide for the transfer of DC supervision of transmission path circuit IC1 to either a junctor circuit such as JC1 or a service circuit such as SCJ. The function of these relays COR1 and COT1 will be more apparent from the description of the establishment of typical network connections given later herein.

Figure 3:
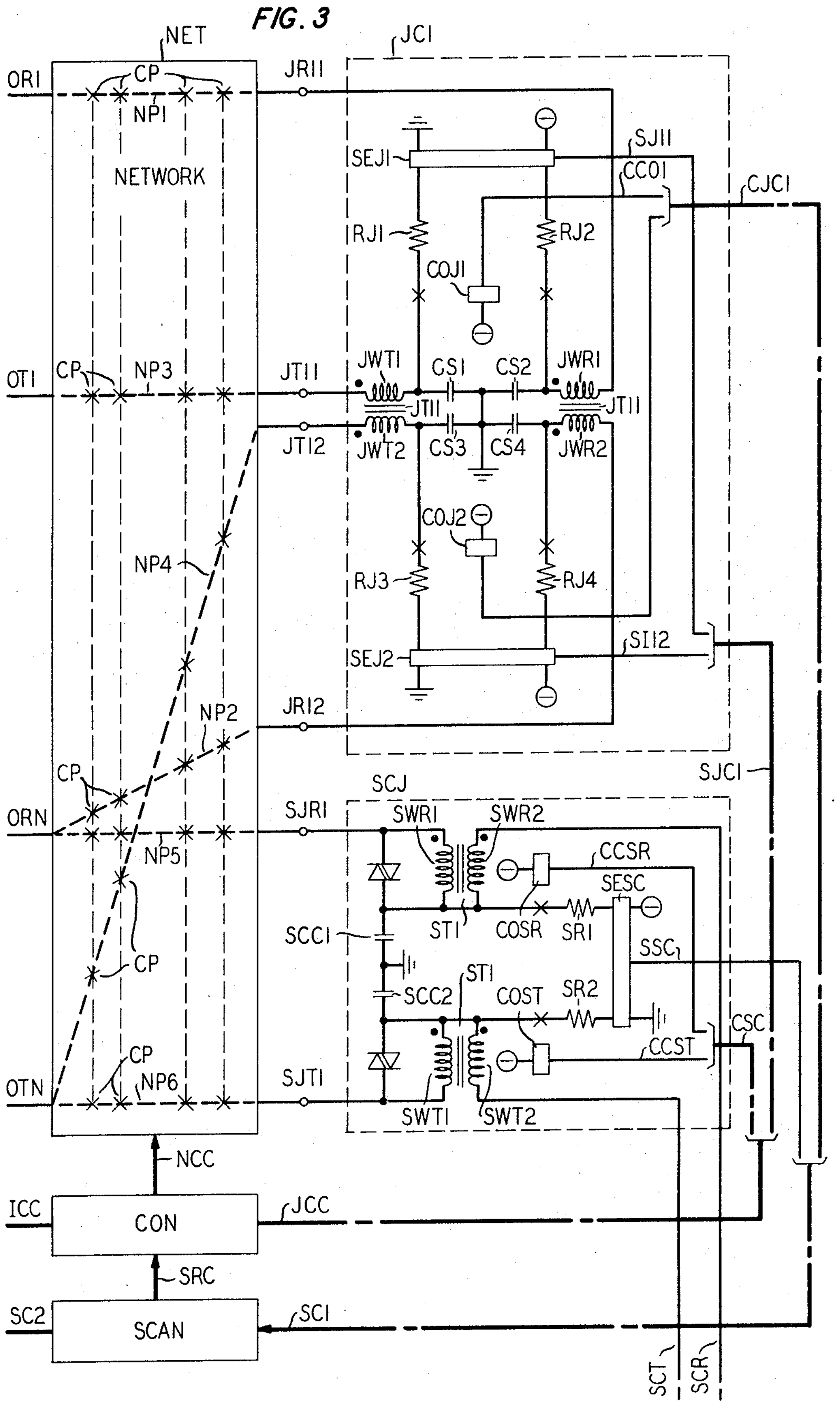

Junctor Circuit—FIG. 3

Junctor circuit JC1 is double-ended in that it serves as a midpoint for connections between transmission path circuits IC1–ICN. At one end of junctor circuit JC1, tip- and ring-conductor terminals JR11 and JT11 of junctor circuit JC1 are DC isolated from one another by capacitors CS1 and CS2. Negative and ground potentials can be supplied to these terminals JR11 and JT11 through sensing element SEJ1, resistors RJ1 and RJ2, normally open contacts of cutoff relay CS1, and the respective windings JWR1 and JWT1 of transformer JI11. Ground potential connected between capacitors CS1 and CS2 serves as a reference potential for a single-wire network path from either terminal JR11 or JT11. Cutoff relay COJ1, when operated, connects line current sources through supervisory element SEJ1 when DC supervision of a transmission path circuit IC1–ICN connected to junctor circuit JC1 is transferred from the transmission path circuit IC1–ICN to the junctor circuit JC1. Sensing element SEJ1 is connected over conductor SJ11 through cables SJC1 and SC1 to scanner SCAN and provides supervisory change-of-state information for one end of junctor circuit JC1 to scanner SCAN.

The other end of junctor circuit JC1, which is connected to terminals JT12 and JR12, is a mirror image of the portion of junctor circuit JC1 described above. A separate sensing element SEJ2 serves to provide supervisory change-of-state information to scanner SCAN. A separate cutoff relay COJ2 is employed to connect sensing element SEJ2 and a source of line current to the terminals JT12 and JR12. Transformer JT11 and capacitors CS1–CS4 inductively couple the two ends of junctor circuit JC1. However, no DC path is provided between the two ends.

Service Circuit—FIG. 3

Service circuit SCJ is substantially identical to the transmission path circuits IC1–ICN. One exception is the supervision cutoff function. In service circuit SCJ, the contacts of cutoff relays COSR and COST are normally open. These contacts are closed only when DC supervision of a transmission path circuit IC1–ICN is transferred to service circuit SCJ.

Network—FIG. 3

Network NET is a multistage switching network which establishes single-wire multistage connections between selected terminals thereof in response to control signals received from control CON over channel NCC. As illustrated in FIG. 3, the illustrative network NET includes four stages of cross-points CP thereby providing three sets of single-wire interstage links. The cross-points CP of network NET which serve to interconnect interstage links and network terminals can be any of the well-known switching network cross-point devices. Many types of cross-points are suitable for this purpose including ferreed and other reed switches, crossbar switches, etc. The specific details of network NET are unnecessary for an understanding of the present invention. Accordingly, no detailed description thereof is included herein.

SINGLE-WIRE NETWORK CONNECTION

It is assumed that control CON has ascertained from received-call signaling information that a single-wire network transmission path is required between transmission path circuit IC1 and transmission path circuit ICN. Accordingly, control CON transmits control signals via channel NCC to network NET which cause network NET to establish a first single-wire network path NP1 between terminal OR1 and terminal JR11 and a second single-wire network path NP2 between terminal ORN and terminal JR12.

Upon establishment of these single-wire network paths NP1 and NP2, control CON transmits control signals over control channels ICC and JCC which cause the cutoff relays COR1, CORN, COJ1 and COJ2 to be operated. A signal on conductor CCR1 of cables CIC1 and ICC operates relay COR1 in transmission path circuit IC1. A signal on conductor CCRN of cables CICN and ICC operates relay CORN in transmission path circuit ICN. Signals on conductors SJ11 and SJ12 of cables SJC1 and JCC operate relays COJ1 and COJ2, respectively. Operation of relay COR1 opens the normally closed contact thereof, thereby cutting off negative potential from ring-conductor IR1 of transmission path circuit IC1. Operation of relay CORN opens the normally closed contact thereof, thereby cutting off negative potential from ring-conductor IRN of transmission path circuit ICN. Operation of relay COJ1 closes the normally open contacts thereof, thereby applying negative potential to terminal JR11 of junctor circuit JC1. Operation of relay COJ2 closes the normally open contacts thereof, thereby applying negative potential to terminal JR12 of junctor circuit JC1.

As a result of the aforenoted relay operations in transmission path circuits IC1 and ICN and junctor circuit JC1, DC supervision is effectively transferred from the transmission path circuits IC1 and ICN to junctor circuit JC1. The DC supervisory path for transmission path circuit IC1 can be traced from ground potential through sensing element SEI1, resistor R12, the normally closed contact of relay COT1, one winding TWT2 of transformer T11, tip-conductor IT1, the transmission path circuit loop to ring-conductor IR1, two windings TWR2 and TWR1 of transformer T11, terminal OR1, network path NP1, terminal JR11, one winding JWR1 of transformer JI11, the now operated contact of relay COJ1, resistance RJ2, and sensing element SEJ1 to negative potential. Thus, a supervisory DC path including the transmission path circuit loop has been established. Current flow in this loop can be monitored either by sensing element SEI1 in transmission circuit IC1 or by sensing element SEJ1 in junctor circuit JC1.

A similar DC supervisory path is available between the other end of junctor JC1 and transmission circuit ICN. This DC path can be traced from ground potential through sensing element SEIN, resistor RN2, the normally closed contact of relay COTN, one winding NWT2 of transformer TN1, tip-conductor ITN, the transmission path circuit loop to ring-conductor IRN, two windings NWR2 and NWR1 of transformer TN1, terminal ORN, network path NP2, terminal JR12, one winding JWR2 of transformer JI11, the now operated contact of relay COJ2, resistance RJ4, and sensing element SEJ2 to negative potential. Current flow in this DC supervisory path can be monitored either by sensing element SEIN in transmission path circuit ICN or sensing element SEJ2 in junctor circuit JC1. Thus, DC supervision is available for both transmission path circuits IC1 and ICN from either the transmission path circuits themselves or from the junctor circuit JC1 connected therebetween.

An unbalanced, ground return, communication path now exists between transmission path circuits IC1 and ICN through junctor circuit JC1. Both tip- and ring-conductors IR1 and IT1 of transmission path circuit IC1 are effectively coupled through transformer T11 and capacitors C11 and C12 to a single-wire communication path extending from terminal OR1. Ground potential connected between capacitors C11 and C12 serves as the reference potential for this unbalanced communication path. A similar reference potential is provided between capacitors CS1 and CS2 of junctor circuit JC1. Both transmission conductors IRN and ITN of transmission path circuit ICN are coupled to terminal ORN by means of transformer TN1 and capacitors CN1 and CN2. The ground potential connected between capacitors CN1 and CN2 serves as a reference potential for the unbalanced single-wire path. A similar reference potential is connected between capacitors CS3 and CS4 of junctor circuit JC1. Windings JWR1 and JWR2 of transformer JI11 in junctor circuit JC1 inductively couple the aforenoted single-wire paths from terminals OR1 and ORN. Thus, a complete unbalanced single-wire communications path is established between the transmission path circuits IC1 and ICN.

A similar single-wire communication path can be established between terminals OT1 and OTN by controlling network NET to establish network paths NP3 and NP4. In this event, control CON would operate cutoff relays COT1 and COTN in transmission circuits IC1 and ICN rather than cutoff relays COR1 and CORN as in the case described above. DC supervision of the respective transmission path circuit loops would be maintained by means of negative potential supplied from the transmission path circuits IC1 and ICN over the ring-conductors thereof IR1 and IRN and ground potential supplied from junctor circuit JC1 to tip-conductor terminals JT11 and JT12.

TWO-WIRE BALANCED NETWORK CONNECTION

It now is assumed that a balanced or metallic two-wire network path between transmission path circuits IC1 and ICN is required for the type of transmission to be performed through network NET. In this event, control CON transmits signals via channel NCC to network NET which cause network paths NP1, NP2, NP3 and NP4 to be established. This action provides a two-wire metallic connection between one end of junctor circuit JC1 and transmission path circuit IC1 and a two-wire metallic transmission path between junctor circuit JC1 and transmission path circuit ICN. These two-wire transmission paths are inductively coupled to each other by transformer JT11 and capacitors CS1–CS4.

Transfer of supervision from the transmission path circuits IC1 and ICN to junctor circuit JC1 is accomplished by signals from control CON which cause the operation of cutoff relays COR1, COT1, CORN COTN, COJ1 and COJ2. Operation of the transmission path circuits cutoff relays COR1, COT1, CORN, and COTN disconnects both negative potential and ground potential from the tip- and ring-conductors IR1, IT1, IRN and ITN of the transmission path circuits IC1 and ICN. Operation of the junctor circuit cutoff relays COJ1 and COJ2 connects negative potential and ground potential respectively to the ring-conductor terminals JR11 and JR12 and the tip-conductor terminals JT11 and JT12. DC current through the transmission conductors of transmission path circuit IC1 can be monitored by means of sensing element SEJ1. DC current through the transmission conductors of transmission path circuit ICN can be monitored by means of sensing element SEJ2. If, for some reason, it was desired to maintain supervision at the transmission path circuits IC1 and ICN rather than transferring supervision to the junctor circuit JC1, all cutoff relays would be left in their nonoperated state. In this condition, supervision of transmission path circuit IC1 would be accomplished by sensing element SEI1 and supervision of transmission path circuit ICN would be accomplished by means of sensing element SEIN. Sensing elements SEJ1 and SEJ2 in junctor circuit JC1 would remain disconnected from the communications path. Thus, DC supervision can be maintained either at the transmission path circuits themselves or at the junctor circuit.

SERVICE CIRCUIT CONNECTIONS

Either single-wire or double-wire connections can be established from any of the transmission path circuits IC1–ICN through network NET to a service circuit such as SCJ. If the function performed by the service circuit SCJ requires a two-wire transmission path, supervision can be transferred from the transmission path circuit to the service circuit SCJ by operating all cutoff relays in both the transmission path circuit and the service circuit. If supervision is to be maintained at the transmission path circuit, no cutoff relays are operated in either the transmission path circuit or the service circuit. If no supervision is needed, as in the case of certain test connections, only the cutoff relays in the transmission path circuit are operated.

One example of the use of a service circuit requiring a two-wire connection through network NET is the employment thereof as a test access point for testing the continuity of network paths and transmission path circuit loops or for performing tests on station equipment or trunk equipment connected to transmission path circuits IC1–ICN.

Single-wire connections can be established through network NET between transmission path circuits IC1–ICN and service circuits such as SCJ. Transfer of supervision from the transmission path circuit to the service circuit is accomplished in exactly the same way as previously described with respect to a transmission path circuit and junctor circuit JC1. As in the above-described case, supervision can be maintained either at the transmission path circuit or at the service circuit.

An example of one use of a service circuit with a single-wire connection through network NET is with a voice frequency receiver employed to receive multifrequency coded call-signaling information by way of a transmission path circuit IC1–ICN. In this situation, there is no requirement either for a high grade transmission link through network NET or for a two-wire metallic path through network NET.

CONCLUSION

Advantageously, depending upon the particular type of transmission facility required for the communications function currently being performed by network NET, either a balanced or an unbalanced transmission path can be established between transmission path circuits terminated on the network or between a transmission path circuit and a service circuit terminated on the network. Since single-wire unbalanced transmission paths are functionally sufficient for most transmission purposes of network NET, the corresponding unused single-wire interstage links advantageously are made available for use in other single-wire communication paths. However, when either a balanced transmission path or a complete metallic path is needed for a particular system function of network NET, such a path can be established.

What is claimed is:

1. A communications switching system comprising
 a first transmission path circuit comprising a first balanced transmission circuit and a first plurality of unbalanced transmission terminals each coupled to said first balanced transmission circuit;
 and a selectively controllable switching network for establishing an unbalanced network transmission path through said network from a selected one of said first plurality of unbalanced transmission terminals and, alternatively, for establishing a balanced network transmission path through said network from more than one of said first plurality of unbalanced transmission terminals.

2. A communication switching system according to claim 1 wherein;
 said first balanced transmission circuit comprises a first multiconductor transmission circuit,
 said first plurality of unbalanced transmission terminals comprises a first plurality of single-conductor terminals,
 said unbalanced network transmission path comprises a single-conductor network path,
 and said balanced network transmission path comprises a multiconductor network path.

3. A communications switching system according to claim 1 further comprising;
 control means for controlling said network to establish selectively said balanced and unbalanced network transmission paths in accordance with the type of transmission facility required for the communication function to be performed by the network transmission path to be established.

4. A communications switching system according to claim 2 further comprising
 control means for controlling said network to establish selectively said single and multiconductor network paths in accordance with the type of transmission facility required for the communication function to be performed by the network path to be established.

5. A communications switching system according to claim 3 wherein said first transmission path circuit comprises
 a DC connection between each of said first plurality of unbalanced transmission terminals and at least one transmission conductor of said first balanced transmission circuit.

6. A communications switching system according to claim 3 wherein said first transmission path circuit comprises
 a source of reference potential,
 DC blocking means for DC isolating each of said first plurality of unbalanced transmission terminals from said reference potential and from all others of said first plurality of unbalanced transmission terminals,
 means including said DC blocking means for AC coupling each of said first plurality of unbalanced transmission terminals with the entire said first balanced transmission circuit and for AC coupling all of said first plurality of unbalanced transmission terminals in a balanced combination thereof with said first balanced transmission circuit, and means for DC coupling each of said first plurality of unbalanced transmission terminals with only a portion of said first balanced transmission circuit.

7. A communications switching system according to claim 4 wherein said first transmission path circuit comprises a source of reference potential, DC blocking means for DC isolating each of said first plurality of single-conductor terminals from said reference potential and from all others of said first plurality of single-conductor terminals, means including said DC blocking means for AC coupling each of said first plurality of single conductor terminals with the entire said first multiconductor transmission circuit and for AC coupling all of said first plurality of single-conductor terminals in a multiconductor combination thereof with said first multiconductor transmission circuit, and means for DC coupling each of said first plurality of single-conductor terminals with only a portion of said first multiconductor transmission circuit.

8. A communications switching system according to claim 7 wherein said first multiconductor transmission circuit comprises a plurality of transmission conductors, said AC coupling means comprises transformer means having windings respectively connected in series with each of said transmission conductors and each of said first plurality of single-conductor terminals, said DC blocking means comprises a capacitor connected between said reference potential and each said winding of said transformer means, and said DC coupling means comprises a connection between each of said first plurality of single-conductor terminals and one of said transmission conductors.

9. A communications switching system according to claim 4 wherein said first transmission path circuit comprises a first pair of different potential sources mutually cooperative for producing current flow through said first multiconductor transmission circuit, first sensing means for monitoring the supervisory state of said first multiconductor transmission circuit, means for selectively disconnecting one of said first pair of different potential sources from said first multiconductor transmission circuit when said single-conductor network path is established, and means including said last-named means for disconnecting said sensing means and both said first pair of potential sources from said first multiconductor transmission circuit when said multiconductor network path is established.

10. A communications switching system according to claim 9 comprising a second transmission path circuit comprising a second multiconductor transmission circuit coupled to each of a second plurality of single-conductor terminals to which one of said single and multiconductor network paths is selectively established by said network, second sensing means for monitoring the supervisory state of said first multiconductor transmission circuit via said established one of said single and multiconductor network paths, a second pair of different potential sources, means for connecting said second sensing means and one of said second pair of potential sources to the one of said second plurality of single-conductor terminals to which said one network path is established when said one network path is a single-conductor network path, and means including said last-named means for connecting said second sensing means and both said second pair of potential sources to the ones of said second plurality of single-conductor terminals to which said one network path is established when said one network path is a multiconductor network path.

11. A communications switching system according to claim 4 wherein said first transmission path circuit comprises first supervisory means for monitoring the supervisory state of said first multiconductor transmission circuit, a first pair of different potential sources mutually cooperative to supply line current to said first multiconductor transmission circuit, and means for disconnecting a selected one of said first pair of potential sources from said first multiconductor transmission circuit when said single-conductor network path is established and for disconnecting both said first pair of potential sources and said supervisory means from said first multiconductor transmission circuit when said multiconductor network path is established;

and further comprising a second transmission path circuit comprising a second plurality of single-conductor terminals to which one of said single and multiconductor network paths is selectively established by said network, second supervisory means for monitoring the supervisory state of said first multiconductor transmission circuit via said established one of said single-conductor and multiconductor network paths, a second pair of different potential sources both mutually cooperative for supplying line current to said first multiconductor transmission circuit via said one established network path when said one established network path is a multiconductor network path and each cooperative with one of said first pair of potential sources for supplying line current to said first multiconductor transmission circuit via said one established network path when said one established network path is a single-conductor network path, and means for connecting said second pair of potential sources and said second supervisory means to said second plurality of single-conductor terminals when said one established network path is established thereto.

12. A communication switching system according to claim 4 further comprising a second transmission path circuit comprising a second multiconductor transmission circuit and a second plurality of single-conductor terminals each coupled with said second multiconductor transmission circuit;

a junctor circuit comprising a third plurality of single conductor terminals and a fourth plurality of single-conductor terminals respectively coupled with corresponding said single conductor terminals in said third plurality thereof;

and said switching network selectively controllable to establish a first single-conductor network path from a selected one of said first plurality of single-conductor terminals to a selected one of said third plurality of single conductor terminals, to establish a second single conductor network path from a selected one of said second plurality of single-conductor terminals to a selected one of said fourth plurality of single-conductor terminals, to establish a first multiconductor network path from more than one of said first plurality of single-conductor terminals to more than one of said third plurality of single-conductor terminals, and to establish a second multiconductor network path from more than one of said second plurality of single-conductor terminals to more than one of said fourth plurality of single-conductor terminals.

13. A communications switching system according to claim 12 wherein each of said first and second transmission path circuits comprises a pair of different potential sources mutually cooperative for producing current flow through said multiconductor transmission circuit thereof, sensing means for monitoring the supervisory state of said multiconductor transmission circuit thereof, means for disconnecting a selected one of said pair of potential sources from said multiconductor transmission circuit thereof when said single-conductor network path is established to a corresponding one of said plurality of single-conductor terminals thereof, and means including said last-named means for disconnecting said sensing means and said pair of potential sources from said multiconductor transmission circuit thereof when said multiconductor network path is established to said more than one of said plurality of single-conductor terminals thereof;

and said junctor circuit comprises first and second pairs of different potential sources, each said pair mutually cooperative for producing current flow through a corresponding one of said first and second multiconductor network paths, and each said potential source of said first and second pair thereof individually cooperative with one of said potential sources in said first and second transmission path circuits for producing current flow through said first and second multiconductor transmission circuits via a corresponding one of said first and second single-conductor network paths, means for connecting said first sensing means and one of said first pair of potential sources to said first single-conductor network path when established and for connecting said first sensing means and said first pair of potential sources to said first multiconductor network path when established, and means for connecting said second sensing means and one of said second pair of potential sources to said second single-conductor network path when established and for connecting said second sensing means and said second pair of potential sources to said second multiconductor network path when established.

14. A communications switching system according to claim 13 wherein each of said transmission path circuits and said junctor circuit comprises a source of reference potential, and DC blocking means for DC isolating each said single-conductor terminal thereof from said reference potential and from all other said single-conductor terminals thereof;

each of said transmission path circuits comprises means including said DC blocking means thereof for AC coupling each said single-conductor terminals thereof with said multiconductor transmission circuit thereof, and means for DC coupling each said single-conductor terminal thereof with only a portion of said multiconductor transmission circuit thereof;

and said junctor circuit comprises means including said DC blocking means thereof for AC coupling each said single-conductor terminal in said third plurality thereof with a corresponding said single-conductor terminal in said fourth plurality thereof and for AC coupling all said single-conductor terminals in said third plurality thereof in a multiconductor combination with all said single-conductor terminals in said fourth plurality thereof.

15. A communications switching system comprising a first and a second multiconductor transmission circuit, and means including a selectively controllable switching network for selectively establishing a single-conductor AC coupled network connection between said first and second multiconductor transmission circuits and for selectively establishing a multiconductor AC and DC coupled network connection including said single-conductor network connection between said first and second multiconductor transmission circuits.

16. A communications switching system according to claim 15 further comprising first potential sources selectively connectable to said first multiconductor transmission circuit for producing line current flow therein;

second potential sources connectable to said multiconductor network connection for producing line current flow in said first multiconductor transmission circuit via said multiconductor network connection, and control means for selectively connecting and disconnecting said first and second potential sources in selected combinations thereof for producing line current flow in said first multiconductor transmission circuit via said single-conductor network connection.

17. A communications switching system comprising a transmission circuit having at least two input transmission conductors, at least two output transmission conductors respectively terminated on a switching network, and means for coupling said input conductors on an unbalanced transmission basis to any one of said output conductors and for coupling said input conductors on a balanced transmission basis to said at least two output conductors;

and means for selectively controlling said switching network to establish one single-conductor connection through said network from any selected one of said output conductors and for selectively controlling said switching network to establish a plurality of single conductor connections in parallel through said network from said at least two output conductors.

18. A communications switching system comprising a plurality of two-wire transmission circuits, means including a switching network for establishing a single-wire unbalanced transmission path between selected ones of said two-wire transmission circuits, and means including said switching network for establishing a two-wire balanced transmission path including said single-wire transmission path between said selected two-wire transmission circuits.

19. A communications switching system comprising a plurality of multiple conductor transmission circuits, switching means selectively controllable for establishing a single-conductor communications path between selected ones of said multiple-conductor transmission circuits and selectively controllable for establishing a multiple conductor communications path between said selected multiple conductor transmission circuits, and said single conductor communications path comprising junctor means having supervisory means connectable to said single-conductor communications path for detecting the respective DC supervisory states of said multiple conductor transmission circuits between which said single-conductor communications path is established.

20. A communications switching system comprising a plurality of selectively controllable switching networks each for selectively establishing single-wire network paths between terminals thereof, a plurality of multiple-wire transmission circuits each having at least one terminal on each of said networks, means for controlling selectively said networks to establish a single said network path between a selected two of said multiple-wire transmission circuits through a selected one of said networks and, alternatively, to establish a plurality of said network paths in parallel between said selected two-multiple-wire transmission circuits through more than one of said plurality of networks.

21. A communications switching system comprising a plurality of transmission circuits each having a first and a second transmission conductor;

a switching network for selectively establishing transmission paths between terminals thereof and having a first and a second network terminal for each said transmission circuit;

means in each said transmission circuit for effectively coupling both said first and second transmission conductors to each and to both of said first and second network terminals for said transmission circuit;

said coupling means comprising a source of reference potential and means for blocking direct current flow between said first and second network terminals and between said reference potential and said first and second network terminals;

and said network controllable selectively to establish a single-wire transmission path from the first network terminal for one said transmission circuit to the first network terminal for another said transmission circuit and controllable selectively to establish another single-wire transmission path from the second network terminal for said one transmission circuit to the second network terminal for said other transmission circuit.

* * * * *